(12) United States Patent
Uchida

(10) Patent No.: US 11,747,959 B2
(45) Date of Patent: Sep. 5, 2023

(54) INFORMATION PROCESSING APPARATUS, CONTROL METHOD, AND STORAGE MEDIUM FOR DISPLAYING AN IMAGE

(71) Applicant: CANON KABUSHIKI KAISHA, Tokyo (JP)

(72) Inventor: Hiroyuki Uchida, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/387,838

(22) Filed: Jul. 28, 2021

(65) Prior Publication Data

US 2022/0035492 A1 Feb. 3, 2022

(30) Foreign Application Priority Data

Jul. 31, 2020 (JP) .................. 2020-130509

(51) Int. Cl.
*G06F 3/0482* (2013.01)
*G06F 3/12* (2006.01)
*G06F 3/04855* (2022.01)
*G06F 3/04845* (2022.01)
*G09B 5/02* (2006.01)
*G09B 19/00* (2006.01)

(52) U.S. Cl.
CPC ........ *G06F 3/0482* (2013.01); *G06F 3/04845* (2013.01); *G06F 3/04855* (2013.01); *G06F 3/1203* (2013.01); *G06F 3/1229* (2013.01); *G09B 5/02* (2013.01); *G09B 19/003* (2013.01); *G06F 3/1236* (2013.01); *G06F 3/1286* (2013.01); *G06F 3/1292* (2013.01); *G06F 2203/04803* (2013.01)

(58) Field of Classification Search
CPC .............. G06F 3/0482; G06F 3/04845; G06F 3/04855; G06F 3/1203; G06F 3/1229; G06F 3/1236; G06F 3/1286; G06F 3/1292; G06F 2203/04803; G09B 5/02; G09B 19/003
See application file for complete search history.

(56) References Cited

U.S. PATENT DOCUMENTS 6,466,237 B1 * 10/2002 Miyao ..................... G06F 16/54
715/848
11,164,219 B1 * 11/2021 Bonzi ................... G06F 16/954
(Continued)

FOREIGN PATENT DOCUMENTS

JP 2010092246 A 4/2010

*Primary Examiner* — Beau D Spratt
(74) *Attorney, Agent, or Firm* — Canon U.S.A., Inc. IP Division

(57) ABSTRACT

A control method of controlling an information processing apparatus includes displaying an image corresponding to one section of a plurality of sections of a predetermined operation for another apparatus, which is different from the information processing apparatus, in a predetermined display area, displaying a plurality of thumbnails corresponding to the plurality of sections, and in a case where a user selects a thumbnail from the plurality of thumbnails, controlling in such a manner that an image corresponding to a section of the plurality of sections corresponding to the selected thumbnail is displayed in the predetermined display area, wherein information that represents a section number of a corresponding section of the plurality of sections is added to the plurality of thumbnails.

18 Claims, 4 Drawing Sheets

(56) References Cited

U.S. PATENT DOCUMENTS

| | | | |
|---|---|---|---|
| 2007/0115109 A1* | 5/2007 | Turney | H04N 7/18 |
| | | | 340/506 |
| 2010/0107077 A1* | 4/2010 | Hanawa | G06Q 10/06393 |
| | | | 715/833 |
| 2014/0033040 A1* | 1/2014 | Thomas | G09B 5/06 |
| | | | 715/721 |
| 2014/0204403 A1* | 7/2014 | Young | G06F 3/1259 |
| | | | 358/1.14 |
| 2014/0267867 A1* | 9/2014 | Lee | H04N 9/74 |
| | | | 348/333.01 |
| 2015/0032580 A1* | 1/2015 | Altermatt | H04N 7/181 |
| | | | 705/28 |
| 2016/0328627 A1 | 11/2016 | Fujii et al. | |
| 2017/0013278 A1 | 1/2017 | Mizuno | |
| 2017/0083766 A1 | 3/2017 | Risinger et al. | |
| 2018/0007227 A1* | 1/2018 | Komaba | H04N 1/2129 |
| 2018/0225831 A1 | 8/2018 | Muramatus | |

\* cited by examiner

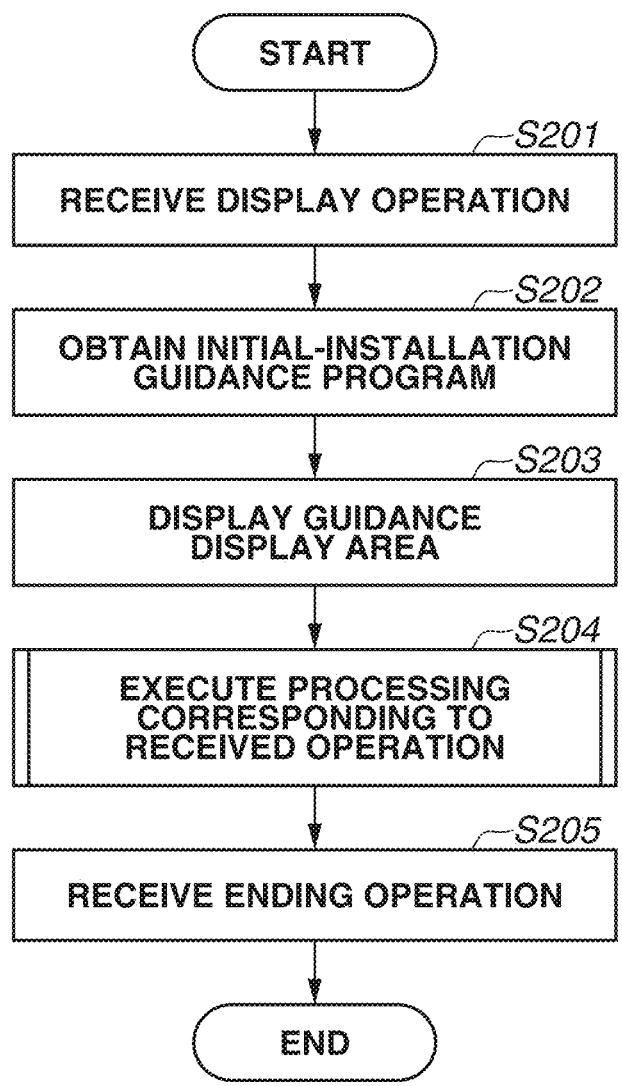

INFORMATION PROCESSING APPARATUS, CONTROL METHOD, AND STORAGE MEDIUM FOR DISPLAYING AN IMAGE

BACKGROUND

Field of the Disclosure

The present disclosure relates to an information processing apparatus, a control method, and a storage medium.

Description of the Related Art

Techniques that display, in a predetermined display area, an image corresponding to a thumbnail selected from a plurality of thumbnails are known. Japanese Patent Application Laid-Open No. 2010-92246 discusses a technique where if a frame is selected from frames in a thumbnail display screen, a moving image after the selected frame is reproduced.

As techniques that display, in a predetermined display area, an image corresponding to a thumbnail selected from a plurality of thumbnails spread, improvement of user convenience using the techniques is required.

SUMMARY

Embodiments of the present disclosure are directed to improving user convenience using a technique that displays an image corresponding to a thumbnail selected from a plurality of thumbnails, in a predetermined display area.

A control method of controlling an information processing apparatus includes displaying an image corresponding to one section of a plurality of sections of a predetermined operation for another apparatus, which is different from the information processing apparatus, in a predetermined display area, displaying a plurality of thumbnails corresponding to the plurality of sections, and in a case where a user selects a thumbnail from the plurality of thumbnails, controlling in such a manner that an image corresponding to a section of the plurality of sections corresponding to the selected thumbnail is displayed in the predetermined display area, wherein information that represents a section number of a corresponding section of the plurality of sections is added to the plurality of thumbnails.

Further features of the present disclosure will become apparent from the following description of exemplary embodiments with reference to the attached drawings.

BRIEF DESCRIPTION OF THE DRAWINGS

FIG. 2 is a flowchart that illustrates processing executed by an information processing apparatus.

DESCRIPTION OF THE EMBODIMENTS

Hereinafter, exemplary embodiments of the present disclosure will be described in detail with reference to the accompanying drawings. The exemplary embodiments described below do not limit the present disclosure related to the claims. All combinations of characteristics described in the present exemplary embodiments are not necessarily essential to one or more embodiments of the present disclosure.

Figure 1:
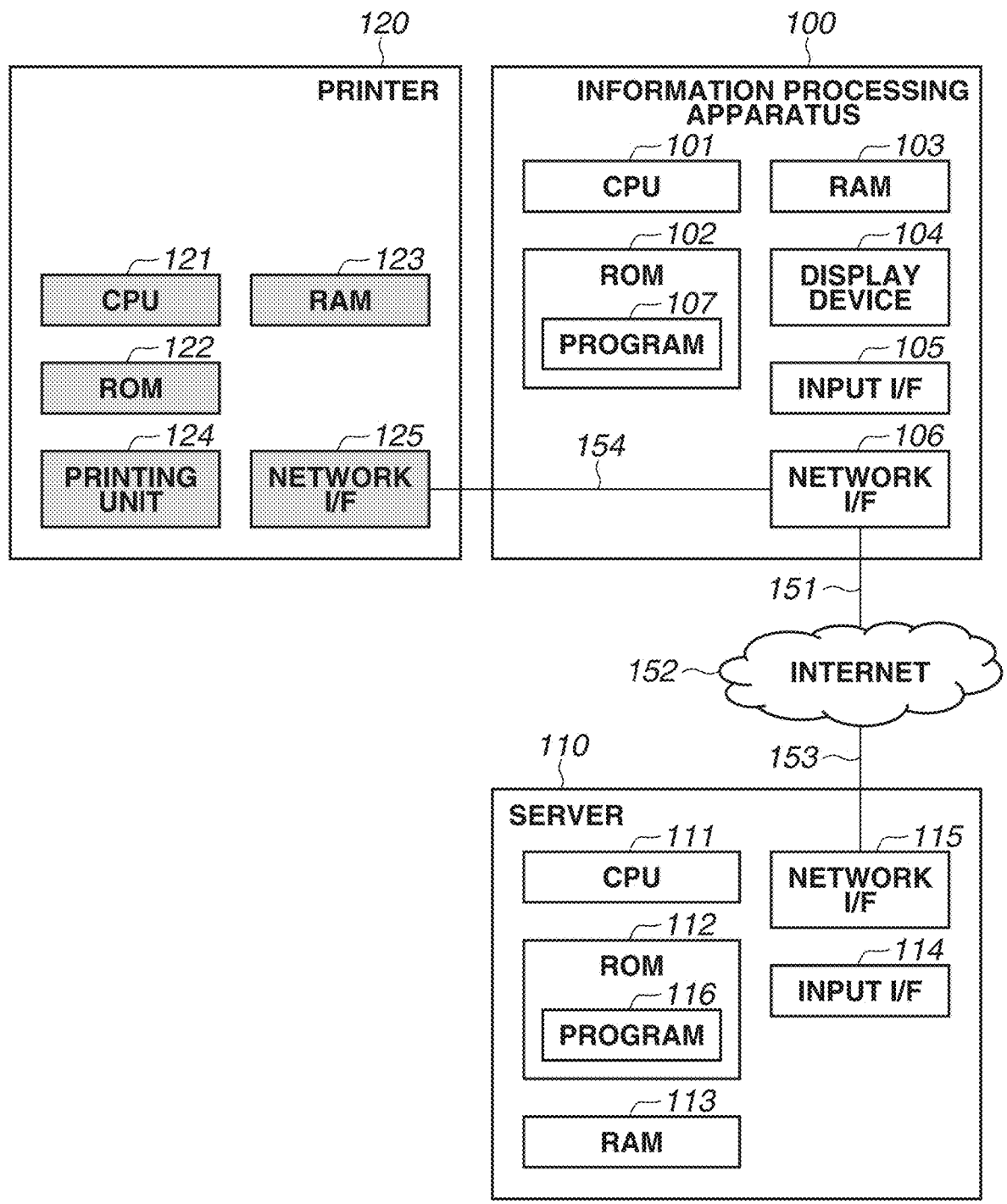
FIG. 1 is a system configuration diagram.

FIG. 1 is a system configuration diagram of a system that includes an information processing apparatus 100 and a server 110 (external server). In the present exemplary embodiment, the information processing apparatus 100 is a personal computer (PC). However, the exemplary embodiment is not limited to the PC. The information processing apparatus 100 can be applied to various apparatuses, such as a smartphone, a mobile terminal, a printer, a scanner, a camera, and a smart speaker. The information processing apparatus 100 includes a central processing unit (CPU) 101, a read-only memory (ROM) 102, a random-access memory (RAM) 103, a display device 104, an input interface (I/F) 105, and a network I/F 106. The CPU 101 is a processor, and controls each of configurations of the information processing apparatus 100 according to programs stored in the ROM 102. The ROM 102 stores programs 107, such as an embedded operating system (OS) and a web browser. The information processing apparatus 100 can be connected to the Internet 152 through a network connection 151. The server 110 can be connected to the Internet 152 through a network connection 153. The network connection 151 and the network connection 153 are, for example, an Ethernet cable, or a connection based on a communication method that complies with Institute of Electrical and Electronics Engineers (IEEE) 802.11 series (Wi-Fi). The network connection 151 and the network connection 153 allow the information processing apparatus 100 and the server 110 to mutually communicate on the Internet 152.

The server 110 includes a CPU 111, a ROM 112, a RAM 113, an input I/F 114, and a network I/F 115. The CPU 111 is a processor, and controls each of configurations of the server 110 according to programs stored in the ROM 112. The ROM 112 stores an embedded operating system (OS) and an initial-installation guidance program 116.

A printer 120 includes a CPU 121, a ROM 122, a RAM 123, a printing unit 124, and a network I/F 125. The CPU 121 is a processor, and controls each of configurations of the printer 120 according to programs stored in the ROM 122. The ROM 122 stores an embedded operating system (OS) and programs that manage print functions. The printing unit 124 is a mechanism that performs printing on a recording medium, such as paper, with a recording material, such as ink. In the present exemplary embodiment, the printing unit 124 performs inkjet printing. However, the exemplary embodiment is not limited to inkjet printing. The printing unit 124 can perform electrophotographic printing or thermal sublimation printing.

The information processing apparatus 100 can communicate to the printer 120 through a network connection 154. More specifically, the information processing apparatus 100 uses a printer driver, a print application program, or the like to transmit a print job to the printer 120, and obtain information on a state of the printer 120. The network connection 154 can be a wireless connection or a wired connection. The wired connection is, for example, a connection by means of a wired local area network (LAN), or a connection by means of universal serial bus (USB). The wireless connection is, for example, a connection by means of a communication method that complies with IEEE 802.11 series (Wi-Fi).

In the present exemplary embodiment, after the printer 120 has arrived, a user needs to perform an initial-installation operation to the printer 120 to allow the printer 120 to perform printing normally. In the present exemplary embodiment, the information processing apparatus 100 shows the user a concrete method of the initial-installation operation to improve convenience of the user who needs to grasp the concrete method of the initial-installation operation.

FIG. 2 is a flowchart that illustrates processing executed by the information processing apparatus 100 according to the first exemplary embodiment. The CPU 101 reads a program stored in the ROM 102 or the like, writes the program to the RAM 103, and executes the program to execute the processing.

First, a user operates the input I/F 105 of the information processing apparatus 100 to start the initial-installation guidance program 116. More specifically, the operation is on a predetermined site displayed on a web browser of the information processing apparatus 100. The predetermined site displays a concrete method of the initial-installation operation. In step S201, the CPU 101 receives the operation. In a case where the operation has been performed, in step S202, the CPU 101 requests the initial-installation guidance program 116 from the server 110 through the network connection 151, and obtains the initial-installation guidance program 116 from the server 110. In step S203, the CPU 101 uses the initial-installation guidance program 116 to display an area, in which a concrete method of the initial-installation operation is to be guided to a user on a web browser (hereinafter, a guidance display area), on the display device 104. Then in step S204, the CPU 101 receives one of various kinds of operations from the user while the guidance display area is displayed, and executes processing corresponding to the received operation. Display control performed in steps S203 and S204 is implemented by the CPU 101 reading the initial-installation guidance program 116 stored in the ROM 102 or the like, writing the initial-installation guidance program 116 to the RAM 103, and executing the initial-installation guidance program 116.

Figure 3A:
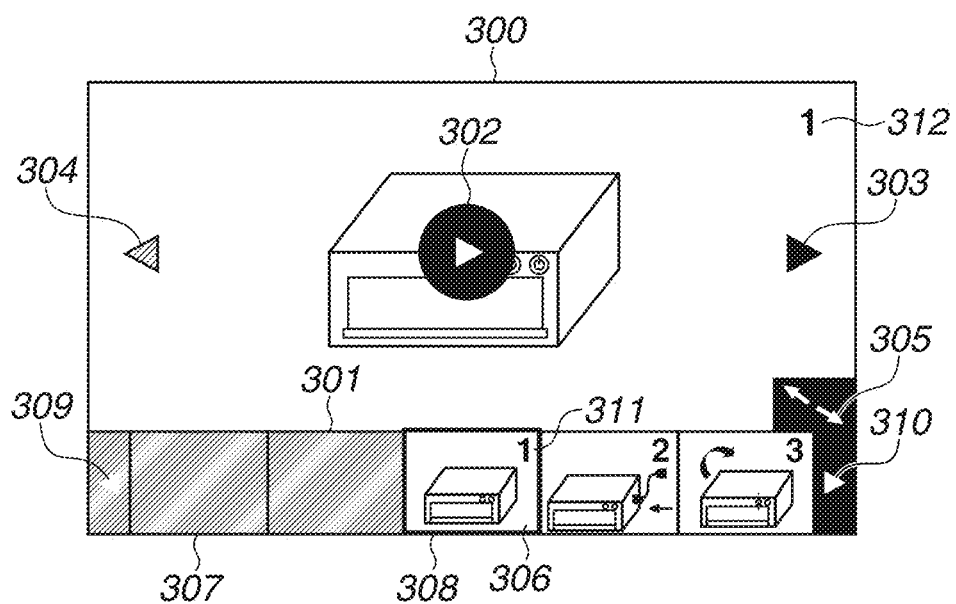
FIGS. 3A and 3B each illustrate an example of a guidance display area.
Figure 3B:
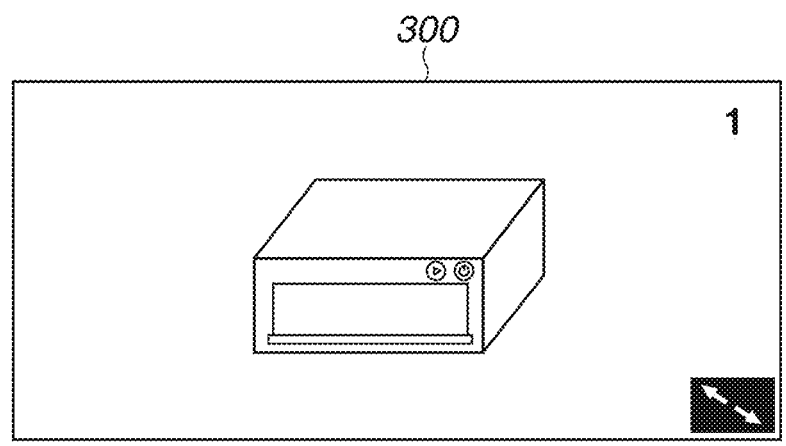

Hereinafter, details of processing in steps S203 and S204 will be described. FIGS. 3A and 3B each illustrate an example of the guidance display area displayed in step S203 according to the present exemplary embodiment. FIG. 3A illustrates the guidance display area including a main display part 300 and a thumbnail display part 301. The main display part 300 displays an area that displays a concrete method of the initial-installation operation. In the present exemplary embodiment, the main display part 300 displays images that illustrate a concrete method of the initial-installation operation of the printer 120 in such a manner that the images are switched at predetermined time intervals in a slide show format. In the present exemplary embodiment, the initial-installation operation includes a plurality of sections. Further, one image corresponds to one of the sections. An image displayed in the main display part 300 is changed for each of the corresponding sections in order. Thumbnails each illustrating one of the sections are displayed in the thumbnail display part 301. A plurality of images can correspond to one section. In this case, the plurality of images corresponding to one section is changed and displayed in order. After all of the plurality of images corresponding to one section have been displayed, images corresponding to a next section are displayed. In the present exemplary embodiment, one of the sections corresponds to one procedure of the initial-installation operation. The initial-installation operation is, for example, an operation to remove a tape stuck to the printer 120. Sections of the operation include, for example, a section that opens a platen cover of the printer 120, a section that pulls a sheet cartridge out of the printer 120, and a section that removes a tape stuck to the printer 120. Further, the initial-installation operation is, for example, an operation to turn on the printer 120. Sections of the operation include, for example, a section that presses down a power button of the printer 120, and a section that connects the printer 120 to a power supply through a cable. Furthermore, the initial-installation operation is, for example, an operation to load sheets of paper into the printer 120. Sections of the operation include, for example, a section that pulls a sheet cartridge out of the printer 120, and a section that operates various levers of the sheet cartridge of the printer 120. Besides these operations, the initial-installation operation can be, for example, an operation to attach an ink tank (ink cartridge) to the printer 120, an operation to provide the printer 120 with ink, or an operation to set up communication between the printer 120 and the information processing apparatus 100. Pressing down a button (not illustrated) on a web browser can control display on the web browser in such a manner that a guidance display area, which is currently being displayed, is switched to a guidance display area corresponding to another initial-installation operation.

The main display part 300 includes a reproduction icon 302, a left icon 304, a right icon 303, a section number 312, and an enlargement icon 305. The thumbnail display part 301 includes an array that includes thumbnails 306 or empty displays 307 (hereinafter referred to as a thumbnail array), a left icon 309, and a right icon 310.

The reproduction icon 302 is for reproducing processing that switches images displayed in the main display part 300 at predetermined time intervals (performing slide show reproduction). The left icon 304 is for displaying, in the main display part 300, an image of a section whose section number is one smaller than a section number of a section of an image displayed in the main display part 300. In a case where a section number of a section of an image displayed in the main display part 300 is 1, the left icon 304 may not be displayed. The right icon 303 is for displaying, in the main display part 300, an image of a section whose section number is one larger than a section number of a section of an image displayed in the main display part 300. In a case where a section number of a section of an image displayed in the main display part 300 is the maximum value, the right icon 303 may not be displayed. The section number 312 is an area that displays a section number of a section of an image displayed in the main display part 300. The enlargement icon 305 is an area for enlarging the guidance display area to a size of the whole of a display area of the display device 104.

A thumbnail 306 corresponds to an image (section) displayed in the main display part 300, and displays a thumbnail of an image displayed in the main display part 300. In a case where any one of thumbnails 306 included in the thumbnail array is selected, an image of a section corresponding to the thumbnail 306 that has been selected is displayed in the main display part 300. Among the thumbnails 306 included in the thumbnail array, the thumbnail 306 corresponding to a section of an image that is being displayed in the main display part 300 is marked with a marker 308 representing its status. In the present exemplary embodiment, the marker 308 is a thick line that surrounds the thumbnail 306. However, the exemplary embodiment is not limited to this. The marker 308 can include various markers. The thumbnail 306 includes a section number 311 that represents a section number of a section to which the thumbnail 306 corresponds. An empty display 307 is an area displayed before a first thumbnail 306 in the thumbnail array. The empty display 307 is an area that does not change display in the main display part 300 even if the area receives an operation from a user. The number of thumbnails 306 that can be displayed in the thumbnail array increases or decreases according to a size of a display area of the display device 104. FIG. 3A illustrates a state where up to five thumbnails 306 can be displayed. The left icon 309 and the right icon 310 are for switching the thumbnails 306 and the empty displays 307, those of which are displayed in the thumbnail array. In a case where the left icon 309 is operated, a thumbnail 306, which has been displayed and has been the first one from the right, is removed from the thumbnail array, and a thumbnail 306, which has a section number 311 that is one smaller than a section number 311 that has been displayed and has been the first one from the left, or an empty display 307 is included in the thumbnail array. That is to say, a sequence of thumbnails 306 and empty displays 307 included in the thumbnail array is shifted to the right. In a case where the right icon 310 is operated, a thumbnail 306 or an empty display 307, which has been displayed and has been the first one from the left, is removed from the thumbnail array, and a thumbnail 306, which has a section number 311 that is one larger than a section number 311 that has been displayed and has been the first one from the right, is included in the thumbnail array. That is to say, a sequence of thumbnails 306 and empty displays 307 included in the thumbnail array is shifted to the left.

As described above, when the reproduction icon 302 is operated, the main display part 300 starts slide show reproduction. In the present exemplary embodiment, in a case where the slide show reproduction is started, the guidance display area is controlled such that the thumbnail display part 301 disappears from the guidance display area, and only the main display part 300 is displayed. That is to say, the guidance display area is controlled to be displayed as shown in FIG. 3B. In a case where the slide show reproduction is stopped by performing a reproduction stop operation to the main display part 300, the thumbnail display part 301 is displayed again in the guidance display area. At this time, the marker 308 is displayed surrounding a thumbnail 306 corresponding to an image that has been displayed in the main display part 300 when the reproduction stop operation is performed. Further, at this time, a sequence of the thumbnails 306 and the empty displays 307 included in the thumbnail array is shifted in such a manner that the thumbnail 306 corresponding to an image that has been displayed in the main display part 300 when the reproduction stop operation is performed is placed at the center of the thumbnail array.

As described above, when the enlargement icon 305 is operated, the guidance display area is enlarged to a size of the whole display area of the display device 104. In this state in the present exemplary embodiment, in a case where the reproduction icon 302 is operated and the thumbnail display part 301 disappears from the guidance display area, the main display part 300 is enlarged in such a manner that the main display part 300 includes an area where the thumbnail display part 301 has been displayed. Consequently, the main display part 300 displays a larger image, and thus visibility of the image improves. If the thumbnail display part 301 disappears from the guidance display area, the main display part 300 can be enlarged not only after the enlargement icon 305 has been operated, but also before the enlargement icon 305 is operated.

A screen including the guidance display area can include, for example, an area where the initial-installation operation corresponding to an image displayed in the main display part 300 is described by means of text. Further, a screen including the guidance display area can include, for example, an area where a moving image is displayed to describe the initial-installation operation corresponding to an image displayed in the main display part 300. In a case where the area is operated, a web page for reproduction of the moving image is newly displayed on a web browser, and the moving image is reproduced on the web page.

After the display control described above has been executed, in a case where the CPU 101 receives an ending operation, such as an operation to close the web browser, from the user, in step S205, the CPU 101 ends display of the guidance display area, and ends the processing.

In the present exemplary embodiment, an operation method of the printer 120 is displayed by the guidance display area, as described above. The user operates the printer 120 while the user watches contents reproduced by the guidance display area displayed by the information processing apparatus 100. Accordingly, the user may miss contents reproduced by the guidance display area while the user operates the printer 120. Further, if the operation method is complicated, the user may want to watch again the contents that are reproduced by the guidance display area and have been already watched. According to the present exemplary embodiment, even if the user misses a particular section while the user operates the printer 120 and takes eyes off the guidance display area, the user can display again an image corresponding to the particular section by an easy operation. Further, the user can display again an image corresponding to a section, which the user wants to watch again, by an easy operation. At this time, in the present exemplary embodiment, the user easily identifies a section that has been already watched, and a section that has been missed, because the section number is assigned to each of images. That is to say, the user easily identifies a section that the user wants to display again, and user convenience improves.

In a second exemplary embodiment, an exemplary embodiment that improves user convenience by highlighting a particularly important procedure and a complicated procedure in a concrete method of the initial-installation operation displayed by the guidance display area. A system configuration according to the present exemplary embodiment is similar to a system configuration of the first exemplary embodiment, unless otherwise described.

Figure 4A:
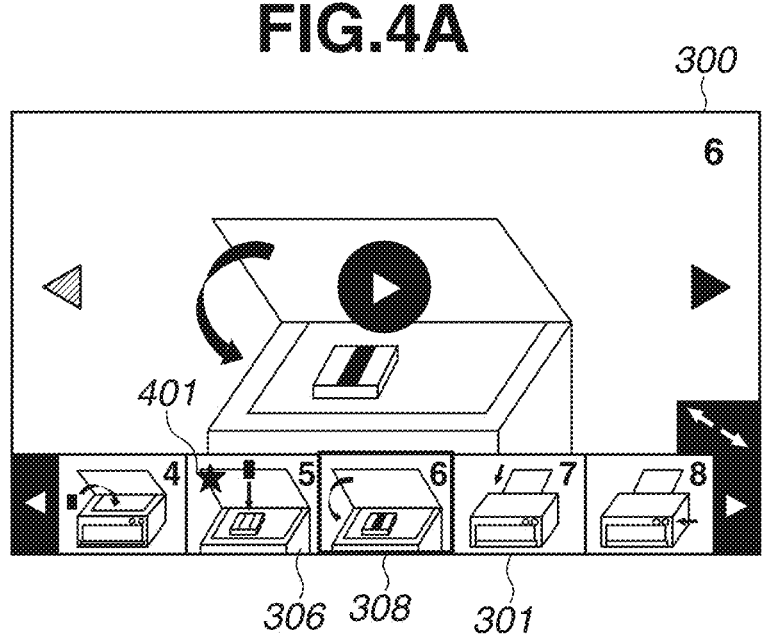
FIGS. 4A and 4B each illustrate an example of the guidance display area.
Figure 4B:
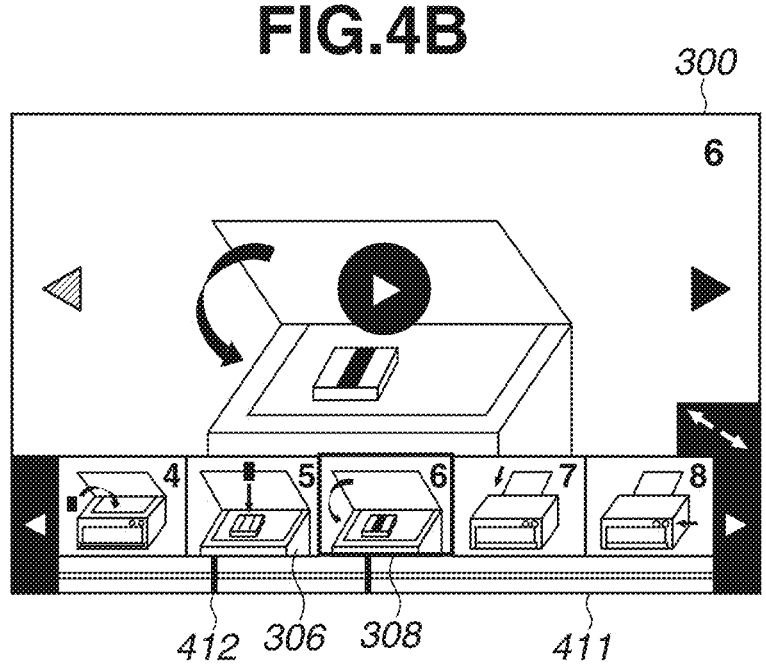

FIGS. 4A and 4B each illustrate an example of the guidance display area displayed in step S203 according to the present exemplary embodiment.

In FIG. 4A, the guidance display area includes the main display part 300 and the thumbnail display part 301, similarly as in FIG. 3A. In FIG. 4A, among the thumbnails 306 included in the thumbnail display part 301, a thumbnail 306 corresponding to a section, which illustrates a particularly important procedure or a complicated procedure, is marked with a marker 401 and thus is highlighted. A thumbnail 306 corresponding to the section, which illustrates a particularly important procedure or a complicated procedure, can be highlighted by another method, such as surrounding the thumbnail 306 with a thick line, or changing a color of the thumbnail 306. In the present exemplary embodiment, a thumbnail 306 corresponding to a section of an image that is being displayed in the main display part 300 is also highlighted (is marked with the marker 308). Therefore, a method of highlighting a thumbnail 306 corresponding to the section, which illustrates a particularly important procedure or a complicated procedure, is desirably different from a method of highlighting a thumbnail 306 corresponding to a section of an image being displayed in the main display part 300. A thumbnail 306 corresponding to the section, which illustrates a particularly important procedure or a complicated procedure, is highlighted even if an image corresponding to the thumbnail 306 is not displayed in the main display part 300.

In a case where a thumbnail 306 corresponding to the section, which illustrates a particularly important procedure or a complicated procedure, is selected, an image displayed in the main display part 300 can be highlighted.

In the present exemplary embodiment, the section, which illustrates a particularly important procedure or a complicated procedure, means a section in which an ink tank is attached to the printer 120, or a section in which it is checked whether an ink tank has been correctly attached to the printer 120. Further, the section can be another section.

FIG. 4B illustrates a guidance display area that is different from the guidance display area in FIG. 4A. In FIG. 4B, the guidance display area includes a seek bar 411. In the present exemplary embodiment, the seek bar 411 is included under the thumbnail display part 301. However, the exemplary embodiment is not limited to this. The seek bar 411 corresponds to a period of reproduction time of the whole of a slide show (or a video) displayed in the main display part 300. The seek bar 411 can correspond to a period of reproduction time of an image corresponding to the thumbnail 306 displayed in the thumbnail display part 301, instead of a period of reproduction time of the whole of a slide show. While a slide show is being reproduced in the main display part 300, a knob or the like can be displayed at a position corresponding to a reproduction time of an image that is currently being reproduced. The knob can be operated and moved by a user to display an image at a reproduction time corresponding to a moved position, in the main display part 300. Instead of the knob, the seek bar 411 itself, for example, can be operated to display an image at a reproduction time corresponding to a position that has been operated on the seek bar 411, in the main display part 300. In the present exemplary embodiment, a position in the seek bar 411 corresponding to a reproduction time where a section, which illustrates a particularly important procedure or a complicated procedure, is displayed is highlighted (marked with a marker 412). Therefore, the user can easily display an image corresponding to the section, which illustrates a particularly important procedure or a complicated procedure, by moving the knob to a highlighted position or by operating the highlighted position.

In some exemplary embodiments, highlighting performed by marking the thumbnail 306 with the marker 401 as illustrated in FIG. 4A, and highlighting performed by marking the seek bar 411 with the marker 412 as illustrated in FIG. 4B can be both performed.

Thus, the user can easily identify the section, which illustrates a particularly important procedure or a complicated procedure, and can easily display an image corresponding to the section, which illustrates a particularly important procedure or a complicated procedure, in the main display part 300. Consequently, the user can easily watch again an image corresponding to the section, which illustrates a particularly important procedure or a complicated procedure.

In the above description, the exemplary embodiments in which still images are displayed in the main display part 300 in a slide show format. However, the exemplary embodiments are not limited to this. In some exemplary embodiments, a video can be displayed in the main display part 300. In this case, the video is divided into sections. The thumbnails 306 illustrating each of the sections are displayed in the thumbnail display part 301. That is to say, in a case where the thumbnail 306 is selected, a video is reproduced from a reproduction time of a section corresponding to the thumbnail 306 that has been selected. In a case where the reproduction icon 302 is operated, the main display part 300 starts reproduction of video data, while in a case where reproduction of video data of one section ends, video data of a next section is reproduced seamlessly. The thumbnail 306 can be a top frame image of a section of a video.

The above description presents the exemplary embodiments in which an area that illustrates a concrete method of the initial-installation operation is displayed on a web browser. However, the exemplary embodiments are not limited to this. The area can be displayed by means of an application program or the like of the information processing apparatus 100.

The above description presents the exemplary embodiments in which the initial-installation guidance program 116 is obtained from the server 110. However, the exemplary embodiments are not limited to this. In some exemplary embodiments, the initial-installation guidance program 116 can be included in an application program or the like, which has been preliminarily stored in the information processing apparatus 100.

In the above description, an operation indicated by the guidance display area is the initial-installation operation of the printer 120. However, the exemplary embodiments are not limited to this. Instead of the initial-installation operation, an operation indicated by the guidance display area can be, for example, an operation after completion of the initial-installation operation (for example, an operation for printing, or an operation for communication with another apparatus). Further, the operation illustrated by the guidance display area can be an operation of various apparatuses besides the printer 120.

The present disclosure is realized by providing a system or an apparatus with a storage medium storing program codes of software that provides functions of the exemplary embodiments described above, and a computer of the system or the apparatus executing the program codes stored in the storage medium. In this case, the program codes themselves read from the storage medium realize functions of the exemplary embodiments described above. The storage medium storing the program codes constitutes the present disclosure.

As the storage medium for providing program codes, a flexible disk, a hard disk, an optical disc, a magneto-optical disk, a compact disc read-only memory (CD-ROM), a compact disc recordable (CD-R), a magnetic tape, a non-volatile memory card, a ROM, or a digital versatile disc (DVD), for example, can be used.

The present disclosure can improve user convenience of the technique that displays an image corresponding to a thumbnail selected by a user from a plurality of thumbnails, in a predetermined display area.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-130509, filed Jul. 31, 2020, which is hereby incorporated by reference herein in its entirety.

What is claimed is:

1. A control method of controlling an information processing apparatus, the control method comprising:
displaying an image corresponding to one section of a plurality of sections of a predetermined operation for another apparatus, which is different from the information processing apparatus, in a predetermined display area;
displaying a plurality of thumbnails corresponding to the plurality of sections; and
in a case where a user selects a thumbnail from the plurality of thumbnails, controlling in such a manner that an image corresponding to a section of the plurality of sections corresponding to the selected thumbnail is displayed in the predetermined display area,
wherein information that represents a section number of a corresponding section of the plurality of sections is added to the plurality of thumbnails,
wherein in a state where an image corresponding to a first thumbnail of the plurality of thumbnails is displayed in the predetermined display area and neither an image corresponding to a second thumbnail of the plurality of thumbnails, the second thumbnail corresponding to a predetermined section of the plurality of sections, nor an image corresponding to a third thumbnail of the plurality of thumbnails, the third thumbnail not corresponding to the predetermined section, are displayed in the predetermined display area, processing for highlighting the first thumbnail by a first method, processing for highlighting the second thumbnail by a second method different from the first method, and processing for displaying the third thumbnail without highlighting the third thumbnail are executed, and
wherein the predetermined section is at least one of a section in which an ink tank is to be set in the other apparatus and a section in which it is checked whether an ink tank has been correctly set in the other apparatus.

2. The control method according to claim 1, wherein information that represents a section number of a corresponding section of the plurality of sections is also added to an image displayed in the predetermined display area.

3. The control method according to claim 1, wherein a plurality of images corresponding to the plurality of sections is displayed in order in the predetermined display area.

4. The control method according to claim 3, wherein, in a case where a predetermined operation is performed, reproduction processing for displaying the plurality of images in order in the predetermined display area starts.

5. The control method according to claim 4, wherein, in a case where the reproduction processing starts, controlling is performed in such a manner that the plurality of thumbnails becomes not displayed.

6. The control method according to claim 5, wherein, in a case where controlling is performed in such a manner that the plurality of thumbnails becomes not displayed, the predetermined display area is enlarged in such a manner that the predetermined display area includes an area where the plurality of thumbnails has been displayed.

7. The control method according to claim 4,
wherein a seek bar corresponding to a period of reproduction time of the reproduction processing is displayed, and
wherein processing for highlighting a position in the seek bar corresponding to a reproduction time at which the second thumbnail of the plurality of thumbnails is displayed in the predetermined display area is executed.

8. The control method according to claim 7, wherein, in a case where a knob on the seek bar is moved, the reproduction processing is executed from a reproduction time corresponding to a position to which the knob has been moved.

9. The control method according to claim 7, wherein, in a case where the seek bar is operated, the reproduction processing is executed from a reproduction time corresponding to a position that has been operated on the seek bar.

10. The control method according to claim 1,
wherein the another apparatus is a printing apparatus, and
wherein the predetermined operation includes at least one of an operation to remove tape stuck to the printing apparatus, an operation to turn on the printing apparatus, an operation to load sheets of paper into the printing apparatus, an operation to attach an ink cartridge to the printing apparatus, and an operation to set up communication between the printing apparatus and the information processing apparatus.

11. The control method according to claim 1,
wherein the information processing apparatus obtains, from an external server, display information for displaying the predetermined display area and the plurality of thumbnails, and
wherein the display information allows the predetermined display area and the plurality of thumbnails to be displayed.

12. The control method according to claim 1, wherein the predetermined display area and the plurality of thumbnails are displayed by a web browser of the information processing apparatus.

13. The control method according to claim 1, wherein images corresponding to the plurality of sections are displayed in order in a slide show format in the predetermined display area.

14. The control method according to claim 1, wherein a video corresponding to the predetermined operation is displayed in the predetermined display area to display in order images corresponding to the plurality of sections.

15. The control method according to claim 1, wherein in a state where the image corresponding to the second thumbnail is displayed in the predetermined display area, processing for highlighting the image corresponding to the second thumbnail is executed.

16. The control method according to claim 1, wherein the predetermined section is a section representing a particularly important procedure or a complicated procedure among the plurality of sections.

17. An information processing apparatus comprising:
one or more processors; and
at least one memory storing executable instructions, which when executed by the one or more processors, cause the information processing apparatus to:
  display an image corresponding to one section of a plurality of sections of a predetermined operation for another apparatus, which is different from the information processing apparatus, in a predetermined display area;
  display a plurality of thumbnails corresponding to the plurality of sections; and
  perform, in a case where a user selects a thumbnail from the plurality of thumbnails, controlling in such a manner that an image corresponding to a section of the plurality of sections corresponding to the selected thumbnail is displayed in the predetermined display area,
wherein information that represents a section number of a corresponding section of the plurality of sections is added to the plurality of thumbnails,
wherein in a state where an image corresponding to a first thumbnail of the plurality of thumbnails is displayed in the predetermined display area and neither an image corresponding to a second thumbnail of the plurality of thumbnails, the second thumbnail corresponding to a predetermined section of the plurality of sections, nor an image corresponding to a third thumbnail of the plurality of thumbnails, the third thumbnail not corresponding to the predetermined section, are displayed in the predetermined display area, processing for highlighting the first thumbnail by a first method, processing for highlighting the second thumbnail by a second method different from the first method, and processing for displaying the third thumbnail without highlighting the third thumbnail are executed, and
wherein the predetermined section is at least one of a section in which an ink tank is to be set in the other apparatus and a section in which it is checked whether an ink tank has been correctly set in the other apparatus.

18. A non-transitory computer-readable storage medium storing a computer program for causing a computer of an information processing apparatus to execute a method comprising:
  displaying an image corresponding to one section of a plurality of sections of a predetermined operation for another apparatus, which is different from the information processing apparatus, in a predetermined display area;
  displaying a plurality of thumbnails corresponding to the plurality of sections; and
  in a case where a user selects a thumbnail from the plurality of thumbnails, controlling in such a manner that an image corresponding to a section of the plurality of sections corresponding to the selected thumbnail is displayed in the predetermined display area,
wherein information that represents a section number of a corresponding section of the plurality of sections is added to the plurality of thumbnails,
wherein in a state where an image corresponding to a first thumbnail of the plurality of thumbnails is displayed in the predetermined display area and neither an image corresponding to a second thumbnail of the plurality of thumbnails, the second thumbnail corresponding to a predetermined section of the plurality of sections, nor an image corresponding to a third thumbnail of the plurality of thumbnails, the third thumbnail not corresponding to the predetermined section, are displayed in the predetermined display area, processing for highlighting the first thumbnail by a first method, processing for highlighting the second thumbnail by a second method different from the first method, and processing for displaying the third thumbnail without highlighting the third thumbnail are executed, and
wherein the predetermined section is at least one of a section in which an ink tank is to be set in the other apparatus and a section in which it is checked whether an ink tank has been correctly set in the other apparatus.

* * * * *